(12) United States Patent
Wang et al.

(10) Patent No.: US 12,487,638 B2
(45) Date of Patent: Dec. 2, 2025

(54) ELECTRONIC DEVICE

(71) Applicant: BYD COMPANY LIMITED, Guangdong (CN)

(72) Inventors: Feng Wang, Shenzhen (CN); Liangliang Huang, Shenzhen (CN); Jingguo Wang, Shenzhen (CN); Zizhu Guo, Shenzhen (CN); Yudong Lei, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 246 days.

(21) Appl. No.: 18/334,871

(22) Filed: Jun. 14, 2023

(65) Prior Publication Data

US 2023/0324956 A1   Oct. 12, 2023

Related U.S. Application Data

(63) Continuation of application No. PCT/CN2021/136854, filed on Dec. 9, 2021.

(51) Int. Cl.
G06F 1/16 (2006.01)

(52) U.S. Cl.
CPC ................... G06F 1/1635 (2013.01)

(58) Field of Classification Search
CPC .............................. G06F 1/1635; G06F 1/1656
See application file for complete search history.

(56) References Cited

U.S. PATENT DOCUMENTS

| | | | |
|---|---|---|---|
| 2006/0210866 A1* | 9/2006 | Horii | H01M 50/209 429/100 |
| 2011/0176283 A1 | 7/2011 | Takei | |
| 2013/0108907 A1* | 5/2013 | Bhardwaj | H01M 10/0431 29/623.2 |
| 2017/0229733 A1 | 8/2017 | Ohwada | |

FOREIGN PATENT DOCUMENTS

| | | |
|---|---|---|
| CN | 102332599 | 1/2012 |
| CN | 103201872 A | 7/2013 |
| CN | 104412419 A | 3/2015 |
| CN | 104885255 A | 9/2015 |
| CN | 208706785 U | 4/2019 |
| CN | 214124022 U | 9/2021 |
| JP | 2006260255 A | 9/2006 |
| JP | 2011044359 A | 3/2011 |

OTHER PUBLICATIONS

International Search Report from PCT/CN2021/136854 dated Mar. 1, 2022 (2 pages).

* cited by examiner

*Primary Examiner* — Adrian S Wilson
(74) *Attorney, Agent, or Firm* — Calfee, Halter & Griswold LLP

(57) ABSTRACT

An electronic device includes a housing, a functional assembly, and a battery. An accommodating space is formed in the housing. The functional assembly includes a functional component, where the functional assembly is mounted in the housing and occupies a part of the accommodating space. The battery includes a main body portion and a protruding portion and an avoidance portion formed on the main body portion, the main body portion and the protruding portion occupy at least a part of the remaining space of the accommodating space, and the avoidance portion is arranged corresponding to the functional component and is configured to avoid the functional component.

10 Claims, 5 Drawing Sheets

ELECTRONIC DEVICE

CROSS-REFERENCE TO RELATED APPLICATIONS

The present disclosure is a bypass continuation of PCT International Application under PCT/CN2021/136854, filed on Dec. 9, 2021, which claims priority to and benefits of Chinese Patent Application No. 202023145684.4, entitled "ELECTRONIC DEVICE" and filed by BYD Co., Ltd. on Dec. 23, 2020. The entire contents of the above-referenced disclosures are incorporated herein by reference.

FIELD

The present disclosure relates to the field of electronic product manufacturing, and specifically, to an electronic device.

BACKGROUND

With the development of technology, an electronic device such as a notebook computer, a mobile phone, or the like is becoming thinner and lighter, which requires that each component of the electronic device should be thinner and lighter. Using the notebook computer as an example, main components of the notebook computer in practical applications are diverse and complex because a shape of the notebook computer is diverse and arrangement of internal components is different. As a battery is one of the key components, it is also very important for the battery to be thinner and lighter. However, due to convenience of manufacturing round and square batteries, most existing notebook computers use square or cylindrical batteries. In addition, a separate battery compartment needs to be set up in advance for the battery. Due to the existence of the battery compartment and the need to take into account other layouts, space utilization is low, and therefore there is room for improvement.

SUMMARY

In view of this, the present disclosure discloses an electronic device, which aims to improve space utilization inside the electronic device, and help implement thinning and lighting of the electronic device.

The solution is as follows:

An electronic device includes:
a housing, where an accommodating space is formed in the housing;
a functional assembly, including a functional component, where the functional assembly is mounted in the housing and occupies a part of the accommodating space; and
a battery; and
the battery includes a main body portion and a protruding portion and an avoidance portion that are formed on the main body portion, the main body portion and the protruding portion occupy at least a part of the remaining space of the accommodating space, and the avoidance portion is arranged corresponding to the functional component and is configured to avoid the functional component.

In an embodiment, the avoidance portion includes a groove provided toward the functional component; and when the battery is assembled to a side of the functional assembly, the groove avoids and accommodates at least a part of the corresponding functional component.

In an embodiment, the functional assembly includes a plurality of functional components; and the avoidance portion includes a plurality of grooves provided corresponding to the plurality of functional components; and depths of the plurality of grooves are the same, and the depths of the grooves are adapted to a functional component with a highest protruding height in the functional assembly.

In an embodiment, the functional assembly includes a plurality of functional components; and the avoidance portion includes a plurality of grooves provided corresponding to the plurality of functional components; and depths of the plurality of grooves are respectively adapted to protruding heights of the plurality of functional components.

In an embodiment, the functional assembly includes a plurality of functional components; and the avoidance portion includes a notch provided corresponding to at least one functional component.

In an embodiment, the notch is located at an edge of the main body portion.

In an embodiment, the main body portion includes a first surface and a second surface that are arranged opposite to each other, the first surface faces the functional component, and the protruding portion and the avoidance portion are formed on the first surface; and the second surface is substantially a plane.

In an embodiment, a plurality of protruding portions are formed on the main body portion, and at least two of the plurality of protruding portions are defined with different heights.

In an embodiment, the battery is a solid-state battery.

In an embodiment, the battery is a semi-solid-state battery.

In the electronic device, the battery includes a main body portion and a protruding portion and an avoidance portion that are formed on the main body portion, the main body portion and the protruding portion occupy at least a part of the remaining space of the accommodating space, and the avoidance portion is arranged corresponding to the functional component, and is configured to avoid the functional component. Therefore, the battery and the functional assembly of the electronic device respectively occupy a part of accommodating space formed by the housing, and in terms of space, the battery and the functional assembly avoid and complement each other, which may implement full utilization of the accommodating space, and is conducive to thinning and lighting of the electronic device.

The additional aspects and advantages of the present disclosure will be set forth in part in the description below, parts of which will become apparent from the description below, or will be understood by the practice of the present disclosure.

BRIEF DESCRIPTION OF THE DRAWINGS

The foregoing and/or additional aspects and advantages of the present disclosure become obvious and easily understood in descriptions of the embodiments with reference to the following accompanying drawings.

REFERENCE NUMERALS

Figure 1:
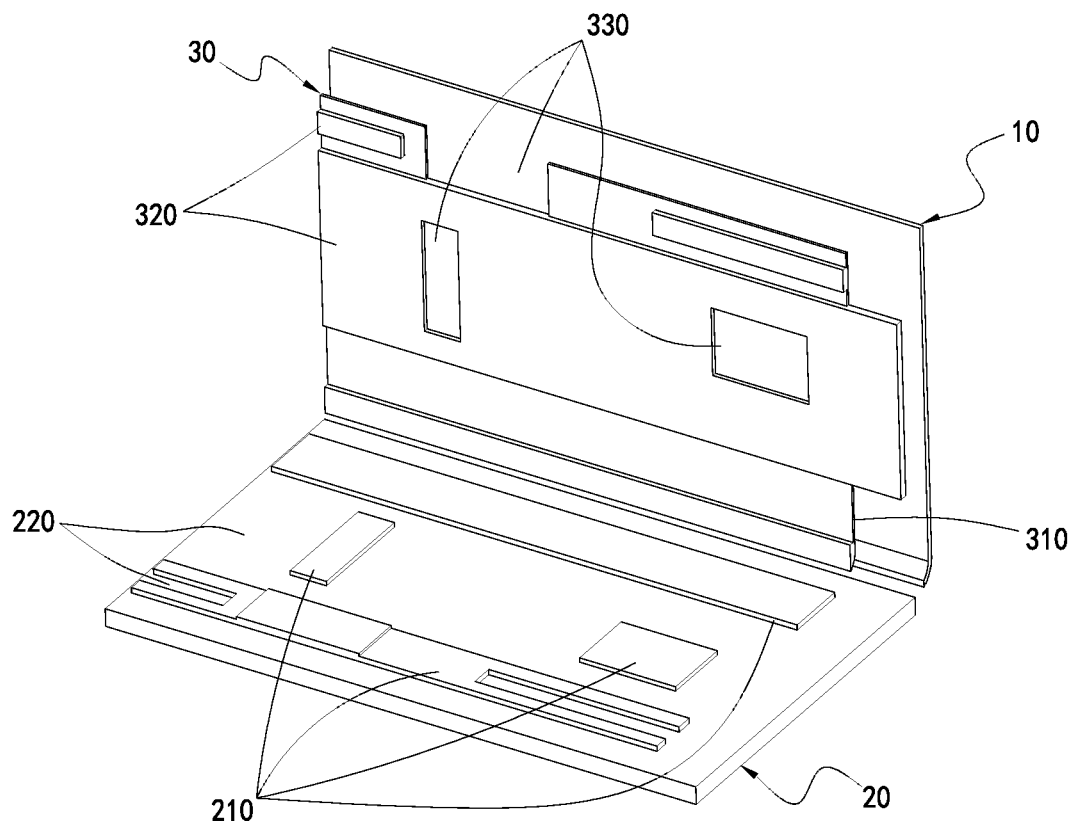
FIG. 1 is a schematic exploded structural diagram of an electronic device in a preferred embodiment.

10 Housing
20 Functional assembly
30 Battery
100 Electronic device
210 functional component
220 Remaining space
310 Main body portion
320 Protruding portion
330 Avoidance portion
3110 First surface
3120 Second surface
3310 Groove
3320 Notch

DETAILED DESCRIPTION

Detail description of the embodiments of the present disclosure will be made in the following, and examples thereof are illustrated in the accompanying drawings, throughout which identical or similar elements or elements of identical or similar functions are represented with identical or similar reference numerals. The embodiments that are described with reference to the accompanying drawings are exemplary, and are only used to interpret the present disclosure, instead limiting the present disclosure.

Figure 2:
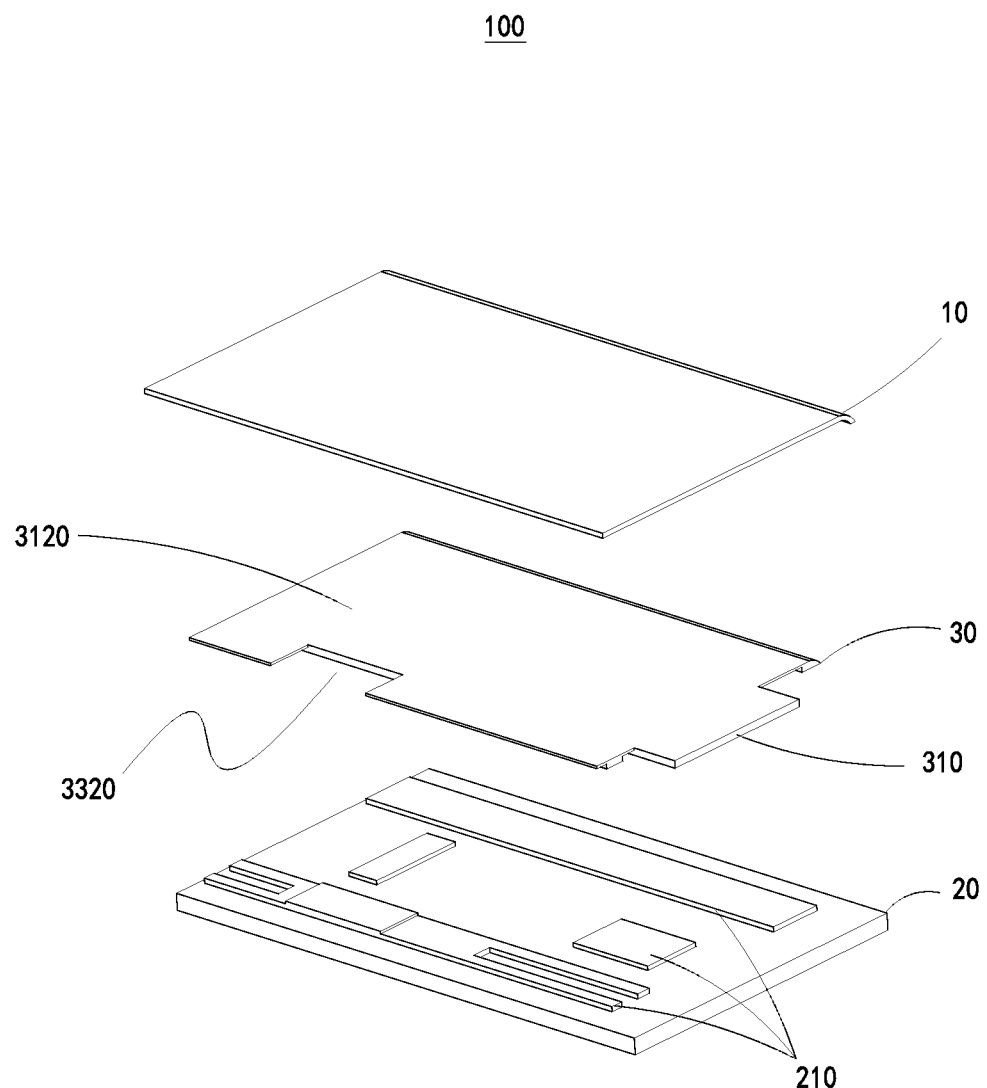
FIG. 2 is a schematic exploded structural diagram of the electronic device shown in FIG. 1 in another state.
Figure 3:
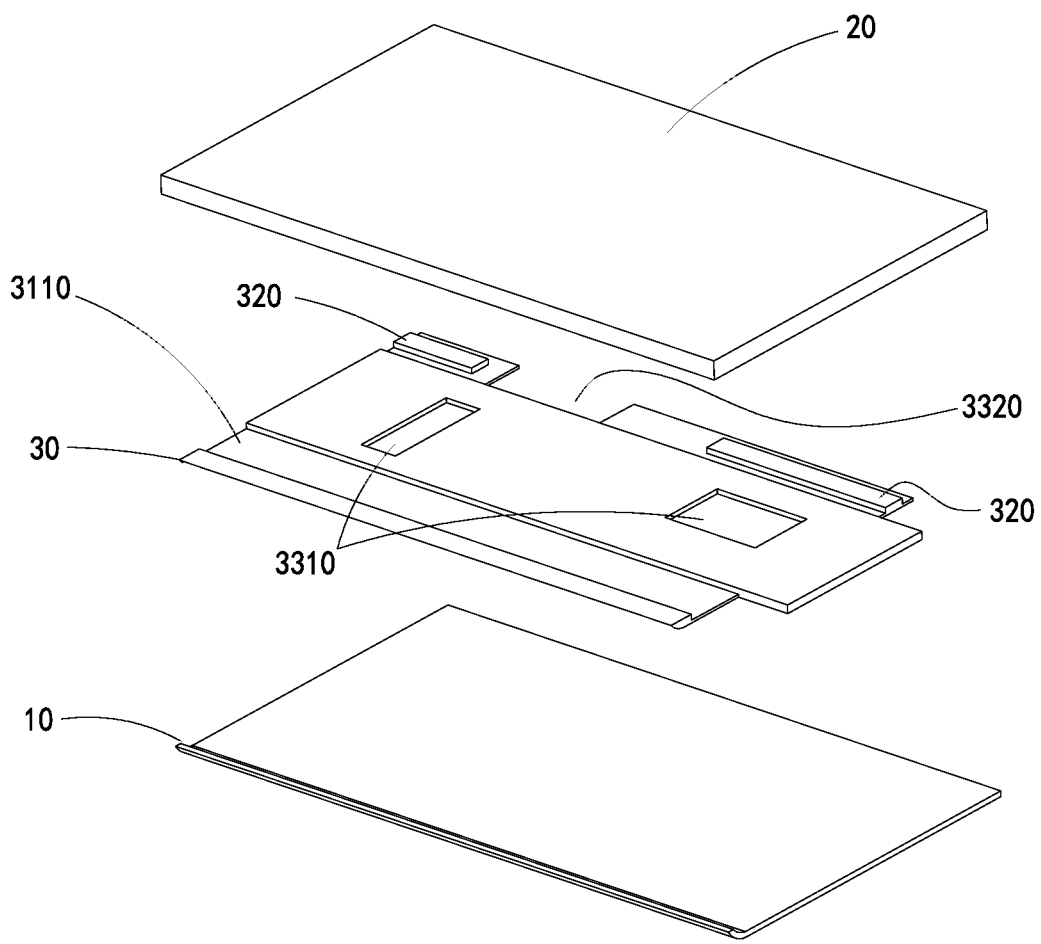
FIG. 3 is a schematic structural diagram of the electronic device shown in FIG. 2 from another angle of view.
Figure 4:
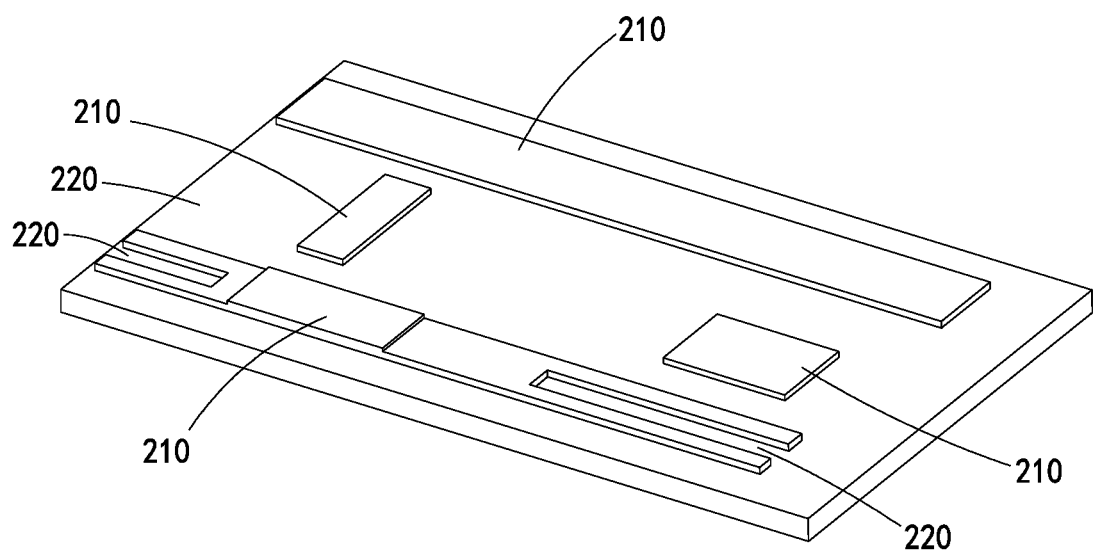
FIG. 4 is a schematic structural diagram of a functional assembly in the electronic device shown in FIG. 2.
Figure 5:
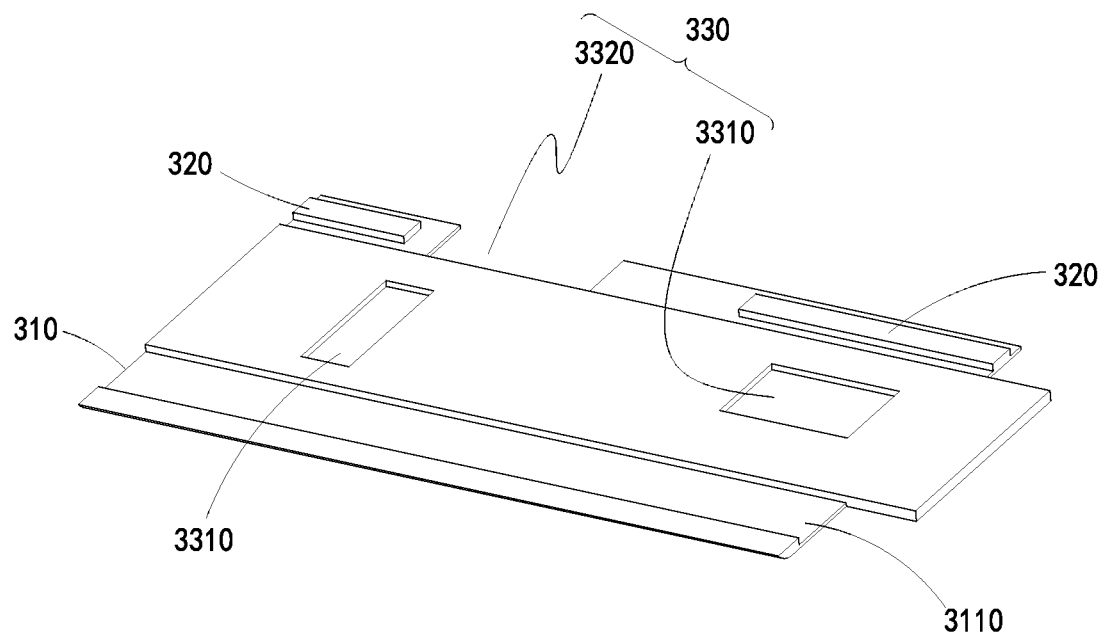
FIG. 5 is a schematic structural diagram of a battery in the electronic device shown in FIG. 2.

As shown in FIG. 1 to FIG. 5, the electronic device 100 includes a housing 10, a functional assembly 20, and a battery 30.

The housing 10 defines an accommodating space, the accommodating space is configured to accommodate the functional assembly 20 and the battery 30. In a specific embodiment, the housing 10 generally includes a shell and a cover plate, the accommodating space is an inner space of the shell, and the cover plate is configured to close an open side of the shell. The housing 10 may be set according to a specific structure of the electronic device 100, and therefore a specific embodiment thereof is not described in detail.

The functional assembly 20 includes a functional component 210, where the functional assembly 20 is mounted in the housing 10 and occupies a part of the accommodating space.

The battery 30 includes a main body portion 310, a protruding portion 320, and an avoidance portion 330.

Both the protruding portion 320 and the avoidance portion 330 are formed on the main body portion 310. It should be noted that the avoidance portion 330 is not a solid structure, but avoidance space formed by a part of the main body portion 310 where solid material is not arranged.

The main body portion 310 and the protruding portion 320 occupy at least a part of the remaining space 220 of the accommodating space. The avoidance portion 330 is arranged corresponding to the functional component 210, and the avoidance portion 330 is configured to avoid the functional component 210. The avoidance portion 330 is arranged corresponding to the functional component 210 may include contents in two aspects. That is, in an assembled state of the electronic device 100, a position of the avoidance portion 330 corresponds to that of the functional component 210. In addition, a spatial shape of the avoidance portion 330 corresponds to that of the functional component 210, so that space vacated by the avoidance portion 330 may be occupied by a corresponding functional component 210.

In a specific embodiment, the electronic device 100 may be a portable device such as a notebook computer or a tablet computer, or another smart electronic product such as a mobile phone or a wearable device. A description is made by using an example in which the electronic device 100 is a notebook computer in FIG. 1 to FIG. 5 of the present disclosure and the description below.

When the electronic device 100 is the notebook computer, the housing 10 is correspondingly a shell of a main unit of the notebook computer, and functional components 210 may include a board, a CPU, a hard disk, a memory, a graphics card, a sound card, a heat sink, and the like. The battery 30 is a power supply battery of the notebook computer.

After the CPU, the hard disk, the memory, the graphics card, the sound card, and the heat sink are mounted on a side of the board, a side of the functional components 210 facing internal accommodating space of the shell occupies a part of the accommodating space, and specifications of the functional components 210 are generally diverse. After the assembly is completed, due to unevenness of the functional components 210, and an arrangement interval between the functional components 210, the remaining part of the accommodating space has an irregular and uneven shape.

Correspondingly, a majority of the main body portion 310 of the battery may often be a relatively regular structure, and may occupy a relatively continuous majority of the remaining accommodating space. In addition, to improve utilization of the accommodating space, the protruding portion 320 is further arranged on the main body portion 310 of the battery, and the avoidance portion 330 is arranged.

By arranging the protruding portion 320, an irregular-shaped remaining space 220 after the functional component 210 is occupied may be further adapted, and at least a part of the remaining space 220 of the accommodating space may be occupied. In a specific embodiment, the protruding portion 320 may be mainly configured to be adapted to an area in the remaining space where no functional component 210 is arranged, or configured to be adapted to an area in the remaining space in which the functional component 210 is mounted and a protruding height of the mounted functional component 210 is less than a predetermined value.

In a specific embodiment, a plurality of protruding portions 320 can be formed on the main body portion 310, and at least two of the plurality of protruding portions 320 are of different heights. Specifically, during embodiment, a plurality of functional components 210 included in the electronic device 100 usually have different sizes and specifications. Correspondingly, space occupied by the plurality of functional components 210 are also different, and the remaining space 220 between the functional components 210 usually have an irregular shape. By setting at least a part of protruding portions in the protruding portions 320 at different heights, the remaining space 220 may be fully utilized. It may be understood that shapes of the plurality of protruding portions 320 may also match a shape of the corresponding remaining space 220 between the functional components 210.

Correspondingly, the avoidance portion 330 may be arranged corresponding to an area in which a protruding height of the functional component 210 is greater than a predetermined value, and the avoidance portion 330 is configured to avoid the functional component 210. A spatial shape of the avoidance portion 330 corresponds to that of the functional component 210, so that space vacated by the avoidance portion 330 may be occupied by a corresponding functional component 210.

In this way, a part of the remaining space not occupied by the functional component 210 may be occupied by the protruding portion 320, and the avoidance portion 330 may vacate a part of the accommodating area for a partially protruding functional component with a relatively great height, thereby not only avoiding interference between the battery 30 and the functional component 210, but also improving the utilization of the accommodating space.

In the electronic device 100, the battery 30 includes a main body portion 310 and a protruding portion 320 and an avoidance portion 330 formed on the main body portion 310, the main body portion 310 and the protruding portion 320 occupy at least a part of the remaining space of the accommodating space, and the avoidance portion 330 is arranged corresponding to the functional component 210, and is configured to avoid the functional component 210. Therefore, the battery 30 and the functional assembly 20 of the electronic device 100 respectively occupy a part of the accommodating space formed by the housing 10, and in terms of space, the battery 30 and the functional assembly 20 avoid and complement each other, which may implement full utilization of the accommodating space, and is conducive to thinning and lighting of the electronic device 100.

In an embodiment, the avoidance portion 330 includes a groove 3310 provided toward the functional component 210. When the battery 30 is assembled to a side of the functional component 210, the groove 3310 avoids and accommodates at least a part of the corresponding functional component 210.

When an overall size of the housing 10 has been set, for a position at which the functional component 210 is arranged, an unoccupied size of the housing 10 in a protruding direction of the functional component 210 may be determined according to a protruding size of the functional component 210 and the size of the housing. In addition, considering process difficulty of processing the battery 30, if the unoccupied size is suitable for arranging the battery 30, then, a groove 3310 may be provided at the position, which not only avoids the functional component 210, but also reserves a part of the battery 30 at a corresponding position. It may be understood that if the unoccupied size is too small, the part of the battery 30 reserved at the corresponding position is discarded. For example, the avoidance portion may include a notch 3320 provided corresponding to the functional component 210, and when the unoccupied size is too small, the battery 30 forms the notch 3320 at the corresponding position.

In a specific embodiment, the notch 3320 is generally located at an edge of the main body portion 310, avoiding a notch provided in the middle of the battery 30, which may reduce the production process difficulty of the battery 30.

The functional assembly 20 generally includes a plurality of functional components 210. Correspondingly, the avoidance portion 330 includes a plurality of grooves 3310 provided corresponding to the plurality of functional components 210.

In an embodiment, depths of the plurality of grooves 3310 are the same. In this case, the depths of the grooves 3310 need to be adapted to a highest protruding height of a functional component 210 in the functional assembly 210. In other words, when the plurality of grooves 3310 are provided to have the same depths, the depths of the grooves 3310 need to be capable of accommodating a protruding part of the functional component 210 with a highest protruding height. In this way, it is ensured that protruding parts of all the functional components 210 may be accommodated in the corresponding grooves 3310. The plurality of grooves 3310 are provided to have the same depths, which may reduce the difficulty of designing and processing the battery 30.

The depths of the plurality of grooves 3310 may also be different or depths of at least a part of grooves 3310 are different. In addition, the depths of the plurality of grooves 3310 are respectively adapted to the protruding heights of the plurality of functional components 3310. In this way, the remaining space 220 obtained after the accommodating space is occupied by the functional component 210 may be fully utilized.

Contours of the grooves 3310 are similar to outer contours of the corresponding functional components 210, so as to accommodate a protruding part of the functional component 210, and simultaneously fully utilize the remaining space 220.

In a preferred embodiment, the main body portion 310 includes a first surface 3110 and a second surface 3120 that are arranged opposite to each other.

The first surface 3110 faces the functional component 210, and the protruding portion 320 and the avoidance portion 330 are formed on the first surface 3110.

The second surface 3120 is substantially a plane. In this way, the main body portion 310 may be adapted to the functional component 210 through the protruding portion 320 and the avoidance portion 330 on one side. The second surface 3120 on the other side is a relatively flat surface, which may be arranged facing the outer housing 10, which facilitates final assembly of the electronic device 100.

In a specific embodiment, the battery 30 may be a solid-state battery or a semi-solid-state battery.

For the battery 30 of the present disclosure, after the protruding portion 320 and the avoidance portion 330 are arranged, a shape of the battery 30 has characteristics such as a special shape and a relatively thin local thickness.

When the battery 30 is manufactured, a size and a shape of pole pieces required at each position need to be designed according to a corresponding shape of the battery.

For pole pieces that need to be designed in irregular sizes, pressed positive and negative pole pieces may be cut into a plurality of specific-shaped positive and negative pole piece units with custom-made positive and negative pole die cutters in the early stage. Then, the positive and negative pole pieces are assembled and placed at specific positions through a stacking process, and positive and negative tabs are reserved during the die-cutting of the pole pieces in the early stage, to simplify material input and design of the tabs. Because the pole pieces at different positions are located inside an integrated battery cell, a tab layout inside the battery needs to be specially designed. In addition, the pole pieces at different positions need to simultaneously operate, and pole pieces with different properties need to be stacked to meet a requirement of consistency.

An ultra-thin part of the battery 30 may be manufactured by using thick electrodes with relatively few folds. However, when a quantity of winding folds of the battery decreases, a surface density of the positive and negative pole pieces of the battery cell gradually increases, and an increase in the surface density puts forward a higher requirement for the battery process and materials. Therefore, if the energy density is gradually increased by reducing the quantity of winding folds, the process needs to be further optimized, and positive and negative electrode materials and an electrolyte need to be improved. Better positive and negative electrode materials in kinetics are used to implement rapid migration of lithium ions inside particles. However, if an ultra-thin battery needs to be produced in a relatively small size and have a relatively high energy density, it is difficult to meet the requirement with the existing commercial battery. Compared with the current commercial battery, the solid-state battery has attracted extensive attention due to characteristics such as high security, a high energy density, an adjustable scale, and large design flexibility. A shape of the solid-state battery may be designed according to specific requirements, either as a thin-film battery with a thickness of only a few microns, or as a battery with a macroscopic size. A solid-state electrolyte may be divided into a gel-state electrolyte, a semi-solid-state electrolyte, a quasi-solid-state electrolyte, and an all-solid-state electrolyte according to a state of the solid-state electrolyte. The solid-state electrolyte is non-flammable, non-corrosive, non-volatile, and has no leakage problems. Therefore, the all-solid-state battery has inherent security and longer service life.

Compared with the existing lithium-ion battery, a liquid-state electrode on one side of the semi-solid-state lithium battery does not include a liquid-state electrolyte, while an electrode on the other side includes the liquid-state electrolyte. A thick electrode may be produced by using the unique production process to simplify structural design. In a case that the positive and negative electrode materials that are used are the same, proportions accounted by a current collector and a separator are reduced to increase the energy density of the battery. In addition, the ultra-thin battery is produced by using the thick electrode.

After the design of pole pieces at different positions and with different sizes is completed, assembly of the pole pieces with different sizes and at different positions is completed by using the stacking process. The battery needs to be stacked from bottom to top to reach a corresponding position in a stretch shell, and then the ultra-thin and special-shaped battery 30 is integrally packaged.

In the description of the present disclosure, it should be understood that, orientations or position relationships indicated by terms such as "center", "longitudinal", "transverse", "length", "width", "thickness", "up", "down", "front", "rear", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the description, rather than indicating or implying that the apparatus or element should have a particular orientation or be constructed and operated in a particular orientation, and therefore, should not be construed as a limitation on the present disclosure.

In addition, the terms "first" and "second" are used merely for the purpose of description, and shall not be construed as indicating or implying relative importance or implying a quantity of indicated technical features. Therefore, a feature defined by "first" or "second" can explicitly or implicitly includes one or more features. In the descriptions of the present disclosure, unless otherwise explicitly specified, "multiple" means more than two.

In the description of the present disclosure, unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in the present disclosure according to specific situations.

In the present disclosure, unless explicitly specified or limited otherwise, a first characteristic "on" or "under" a second characteristic may be the first characteristic in direct contact with the second characteristic, or the first characteristic in indirect contact with the second characteristic by using an intermediate medium. In addition, the first feature being located "above" the second feature may be the first feature being located directly above or obliquely above the second feature, or may simply indicate that the first feature is higher in level than the second feature. That the first feature is "below", "under", and "beneath" the second feature may be that the first feature is right below the second feature or at an inclined bottom of the second feature, or may merely indicate that the horizontal position of the first feature is lower than that of the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of the present disclosure. In the present specification, schematic representations of the above terms are not necessarily directed to the same embodiments or examples. Moreover, the specific features, structures, materials, or characteristics described may be combined in any one or more embodiments or examples in a suitable manner. In addition, different embodiments or examples described in the present specification, as well as features of different embodiments or examples, may be integrated and combined by those skilled in the art without contradicting each other.

Although the embodiments of the present disclosure are shown and described above, it may be understood that, the foregoing embodiments are exemplary, and cannot be construed as a limitation to the present disclosure. Within the scope of the present disclosure, a person of ordinary skill in the art may make changes, modifications, replacement, and variations to the foregoing embodiments.

What is claimed is:

1. An electronic device, comprising:
a housing, wherein an accommodating space is formed in the housing;
a functional assembly, comprising a plurality of functional components, wherein the functional assembly is mounted in the housing and occupies a part of the accommodating space; and
a battery, wherein
the battery comprises a main body portion and a protruding portion and an avoidance portion that are formed on the main body portion, the main body portion and the protruding portion occupy at least a part of the remaining space of the accommodating space, and the avoidance portion comprises a plurality of grooves provided corresponding to the plurality of functional components and is configured to avoid the functional component;
wherein depths of the plurality of grooves are equal and are adapted to the protruding height of the tallest functional component, or depths of the plurality of grooves are respectively adapted to protruding heights of the plurality of functional components.

2. The electronic device according to claim 1, wherein,
when the battery is assembled to a side of the functional assembly, each of the plurality of grooves avoids and accommodates at least a part of the corresponding one of the plurality of functional components.

3. The electronic device according to claim 1, wherein the avoidance portion comprises a notch provided corresponding to at least one functional component.

4. The electronic device according to claim 2, wherein the avoidance portion comprises a notch provided corresponding to at least one functional component.

5. The electronic device according to claim 3, wherein the notch is located at an edge of the main body portion.

6. The electronic device according to claim 1, wherein the main body portion comprises a first surface and a second surface that are arranged opposite to each other, the first surface faces the plurality of functional components, and the protruding portion and the avoidance portion are formed on the first surface; and the second surface is substantially a plane.

7. The electronic device according to claim 2, wherein the main body portion comprises a first surface and a second surface that are arranged opposite to each other, the first surface faces the plurality of functional components, and the protruding portion and the avoidance portion are formed on the first surface; and the second surface is substantially a plane.

8. The electronic device according to claim 1, wherein a plurality of protruding portions are formed on the main body portion, and at least two of the plurality of protruding portions are defined with different heights.

9. The electronic device according to claim 1, wherein the battery is a solid-state battery.

10. The electronic device according to claim 1, wherein the battery is a semi-solid-state battery.

* * * * *